United States Patent [19]
Levine

[11] 3,856,418
[45] Dec. 24, 1974

[54] LIGHT METERING AND CONTROLLING DEVICE

[76] Inventor: Ira A. Levine, 6716 Eastern Ave. N.W., Washington, D.C. 20012

[22] Filed: June 25, 1973

[21] Appl. No.: 373,255

[52] U.S. Cl................ 356/233, 350/314, 350/318, 356/234
[51] Int. Cl............................................. G01j 1/40
[58] Field of Search....... 353/97; 356/213, 233–235, 356/256; 350/311, 314, 315, 318

[56] References Cited
UNITED STATES PATENTS
1,032,260  7/1912  Woodworth........................ 356/233

*Primary Examiner*—Ronald L. Wibert
*Assistant Examiner*—F. L. Evans
*Attorney, Agent, or Firm*—Samuel Levine

[57] ABSTRACT

A light metering and controlling device which comprises a support carrying a series of light filters, each varying in the degree of its density or transparency. An aperture is associated with each filter, the aperture being of a calculated area for the passage of a desired amount of light from a light source. The device is particularly useful in determining and controlling the quantity of light issuing from a slide projector in projecting an image on a surface, such as a wall. The area of an aperture is related to the transparency of its associated filter. The projected image is viewed through the filters and the aperture related to the filter through which the projected image is barely visible is the one placed before the projector to thereby control the light therefrom.

5 Claims, 6 Drawing Figures

Patented Dec. 24, 1974

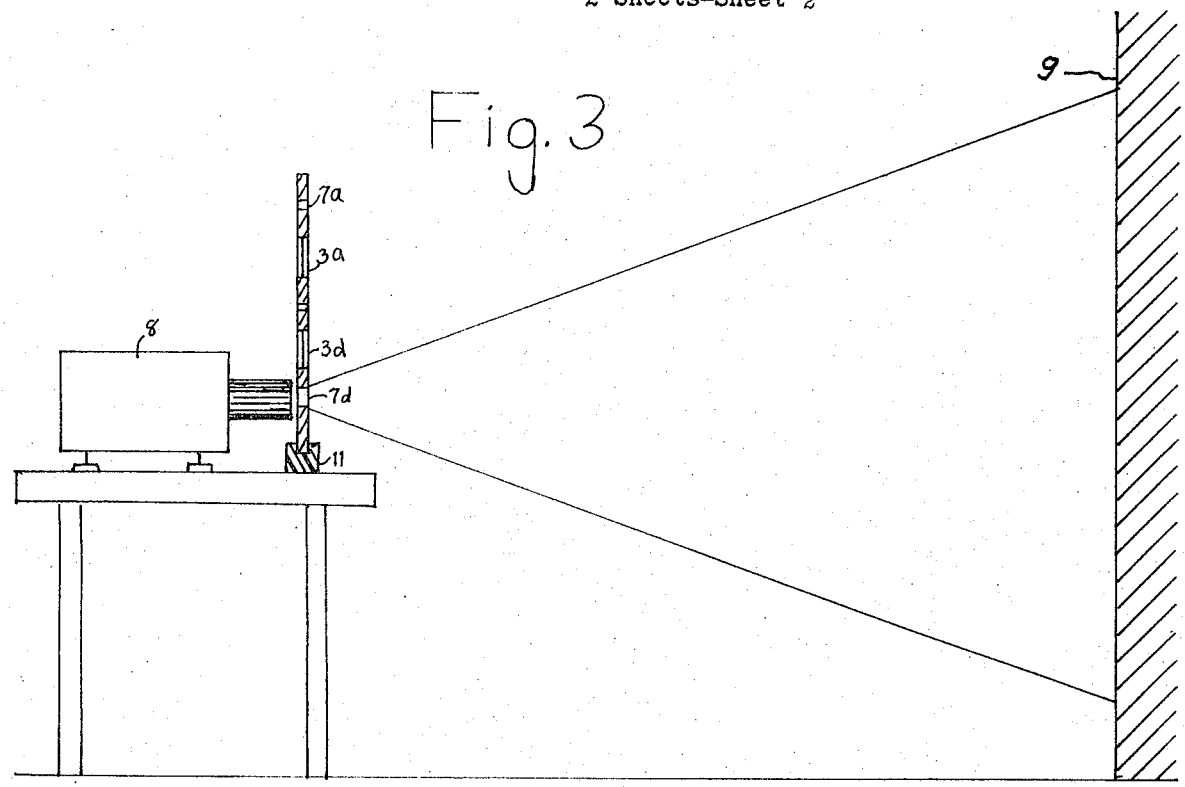
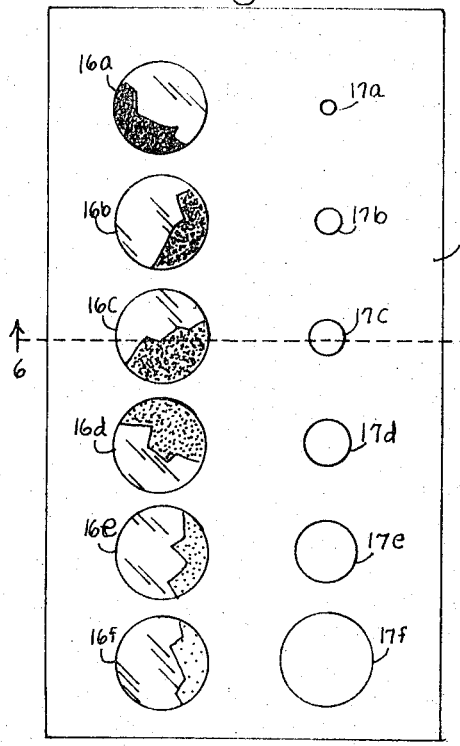
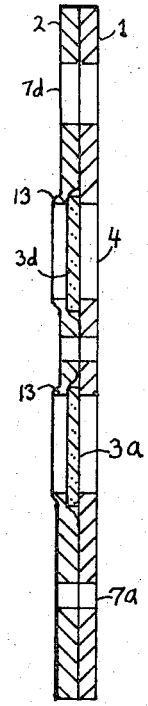
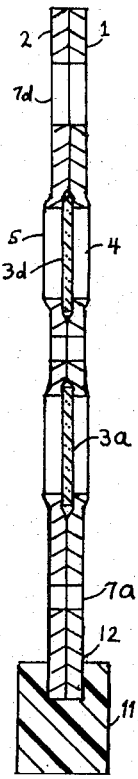

LIGHT METERING AND CONTROLLING DEVICE

This invention relates to a light metering and controlling device, particularly useful in the photographic enlargement art.

In the photographic enlargement art a slide projector is sometimes utilized as an enlarger by projecting the slide to be enlarged on a photosensitive surface. The surface may be photographic paper or any other surface coated with a photographic emulsion. To obtain a proper exposure it is customary to have a constant time exposure and control the amount of light received by the surface from the projector lamp.

An object of this invention is to provide a simplified economical device for determining the intensity of and controlling the light emitted by the projector upon the surface receiving the enlarged image.

A further object is to provide a simple device incorporating filter means to meter or measure the intensity of the light emanating from the projector upon the work surface and reflected therefrom, and further controlling the emanating light by apertures associated with the filter means, to thereby permit the proper amount of light for the specific time exposure.

Another object is to provide a device supporting a series of filter chips progressing from light density or high transparency to heavy densisty or low transparency, each filter being associated with an aperture of sufficient area to permit the passage of a proper quantity of light from the projector therethrough during a given time interval to obtain a full and clear enlargement of the slide on the photographic surface.

Further objects and advantages will be apparent from the following description and accompanying drawings wherein:

FIG. 2 is a sectional view of the device taken along line 2 — 2 of FIG. 1;

FIG. 3 is a diagrammatic view showing the manner of using the device with a projector;

FIG. 4 is a sectional view similar to FIG. 2, of a different embodiment of the device;

FIG. 5 is a plan view of another embodiment of the device; and

Figure 1:
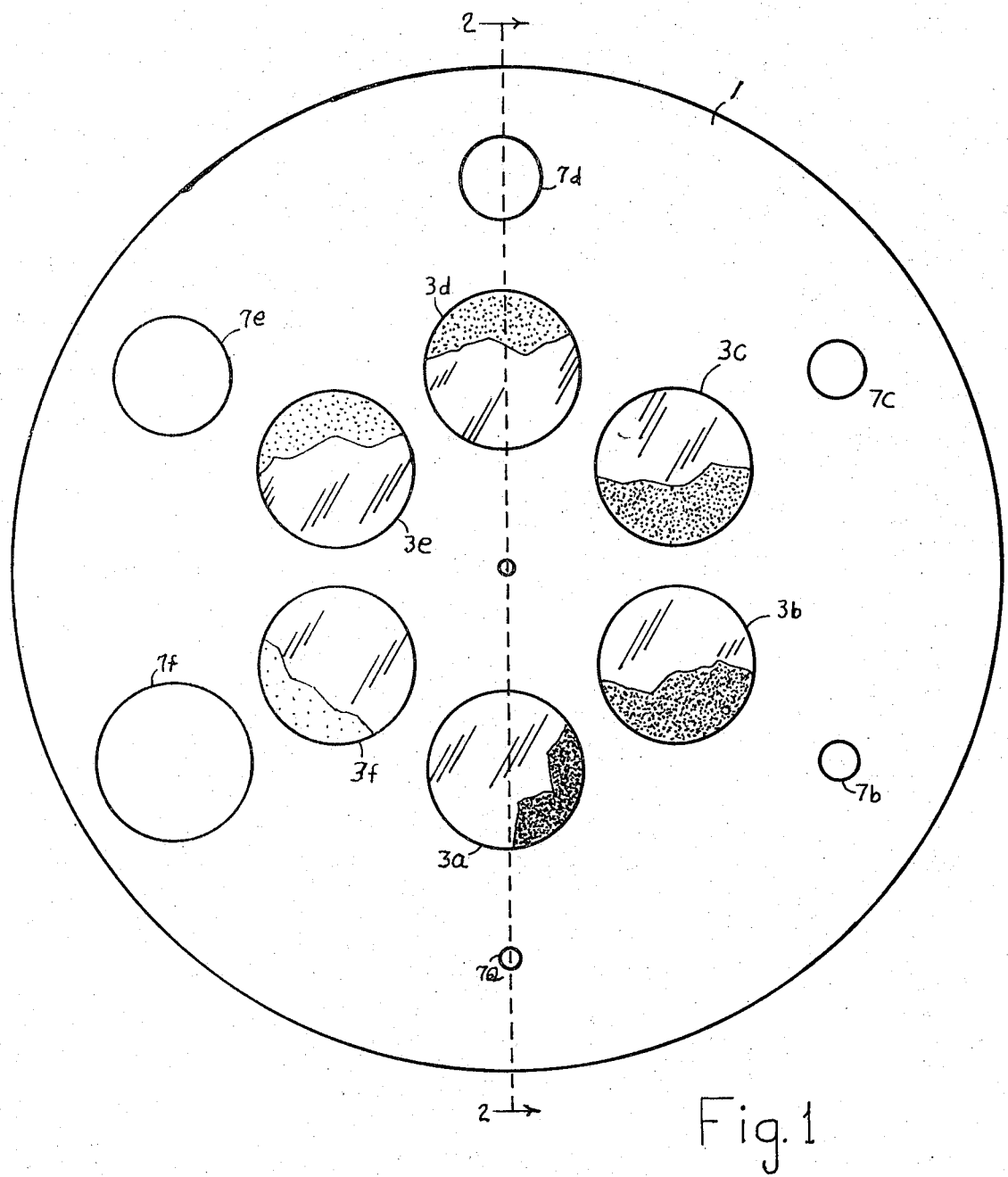
FIG. 1 is a plan view of the device.

Referring to FIGS. 1 and 2, the light metering and controlling device comprises sheets 1 and 2 bonded together to form a support. The sheets may be paper board, plastic, light metal, etc., with sufficient rigidity to act as a support. Between sheets 1 and 2 are located a series of filter chips 3a to 3f progressively decreasing density, that is, of 3f increasing transparency. The filter chips are commercially available and are made in various degrees of density or transparency for transmitting various quantities of light therethrough.

As shown in FIG. 2, sheets 1 and 2 have aligned openings 4 and 5 formed therethrough. A filter 3 is located between sheets 1 and 2 in alignment with openings 4 and 5. When sheets 1 and 2 are bonded together they form a support for the series of filters. As illustrated in FIG. 1, the series may consist of filter 3a to 3f forming a circle of windows with filter 3a being of the highest density, that is, least transparency, and filter 3f being of the lightest density, that is, greatest transparency.

Adjacent to and correlated with each filter apertures 7a to 7f are formed in the sheets. Each aperture is of a calculated area depending upon the transparency or density of its correlated filter.

The area of an aperture is proportional to the transparency of its correlated filter, that is, as the transparency of filters 3a to 3f progressively decreases, the areas of their correlated apertures 7a to 7f will also progressively decrease. Thus, smallest aperture 7a is correlated with filter 3a of the lowest transparency and largest aperture 7f is correlated with filter 3f having the greatest transparency.

FIG. 3 illustrates the use of the device. Slide projector 8 is utilized to project an enlarged image or picture on a working surface 9, such as a wall. The projected image on surface 9 is viewed through each filter, and the filter through which the image is barely seen indicates that its associated aperture is the proper one to control the projected light. Thus, if filter 3d gives the lowest visible image, its associate aperture 7d is used. As illustrated in FIG. 3, the device is placed in holder 11 before the projector with the selected aperture 7d aligned with the lense of the projector. The projector is turned off and wall surface 9 is then coated with a photographic emulsion. The projector is then turned on for a given interval of time thus projecting the image through the aperture which controls the amount of projected light. After the proper exposure, developing and fixing solutions are applied to surface 9 to develop and fix the enlarged picture of the slide.

If the work surface is a photographic paper, the view through the filters would be directed to a surface having the same reflective property as the photographic paper.

Holder 11 may be a block of plastic or wood with a slot 12 therein for the reception of the device, as illustrated in FIG. 2.

FIG. 4 illustrates a different embodiment of the device which would facilitate assembly. In lieu of straight opening 5 in sheet 2, as in FIG. 2, pockets or depressions 13 are embossed or pressed out in sheet 2 to form the openings. Thus, filters 3 can be easily located in pockets 13 and sheet 1 is then bonded to sheet 2 as a cover sheet to hold the filters in their pockets.

The filters need not be arranged in a circular form as in FIGS. 1 to 4. FIG. 5 shows a different form and structure for the device. The support 15 is formed of a rectangular sheet of plastic or photographic film. Support 15 is opaque except for certain areas thereon. Filter means 16a to 16f comprise transparent areas on support 15 with the degree of transparency of each area varied by applying various degrees of transparent printing ink to support 15 at these areas, if it is plastic, or different photographic densities, if support 15 is photographic film. Thus, the areas 16a to 16f act in light transmission function as discrete filters 3a to 3f of FIGS. 1 to 4. Filter areas 16a to 16f are each associated with respective fully transparent areas 17a to 17f. The fully transparent areas 17a to 17f vary in size and are equivalent to apertures 7a to 7f of FIGS. 1 to 4. Areas 17a to 17f may also be formed as apertures by punching our parts of support 15.

Figure 6:
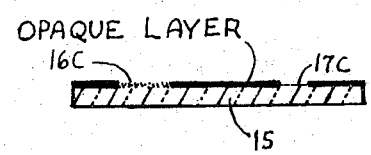
FIG. 6 is a sectional view taken along line 6 — 6 of FIG. 5.

The device of FIGS. 5 and 6 may also be formed by a printing or photographic process, by opaquely inking the surface of a transparent support 15, except the areas of the filter means 16a to 16f and of the aperture means 17a to 17f.

It is apparent that the filters and their apertures of FIGS. 1-4 may be arranged in two straight rows, as illustrated in FIG. 5.

While there has been disclosed certain preferred embodiments of the invention, those skilled in the art will appreciate that changes and modifications may be made therein without departing from the spirit of the invention.

I claim:

1. A light metering and controlling device comprising a support, a series of light filter means mounted in said support, said filter means progressively and decreasingly varying in light transmission therethrough, a series of light apertures in said support, each light aperture being correlated with a respective filter means, the area of each light aperture progressively varying in proportion with the light transmitted through its correlated filter means, the light aperture with the smallest area being correlated with the filter means transmitting the least light.

2. The device set forth in claim 1 wherein the support is provided with a series of openings and the series of filter means comprise filter elements of progressively varying density, each filter means being aligned with a respective opening, and wherein each of the series of light apertures comprises a hole through the support adjacent its associated filter element.

3. The device set forth in claim 2 wherein the support comprises two superimposed sheets having aligned openings with each of said filter elements located between the sheets and in alignment with the openings, said superimposed sheets being secured together to thus support the filter elements.

4. The device set forth in claim 3 wherein the openings in one sheet are deformed to provide pocket formations to house the filter elements.

5. The device of claim 1 wherein the support is a transparent base and wherein the series of the light filter means comprises a series of areas of the base, each area having a film layer of different light transmitting density thereon, and wherein each light aperture comprises a clear area on the base, the rest of the surface of the base having an opaque layer thereon.

* * * * *